United States Patent
Wang et al.

(10) Patent No.: US 11,770,050 B2
(45) Date of Patent: Sep. 26, 2023

(54) HEAT EXCHANGE SYSTEM AND MOTOR

(71) Applicant: XINJIANG GOLDWIND SCIENCE & TECHNOLOGY CO., LTD., Xinjiang (CN)

(72) Inventors: Dinghui Wang, Beijing (CN); Jinhui Li, Beijing (CN); Junwei Liu, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 154 days.

(21) Appl. No.: 17/607,336

(22) PCT Filed: Feb. 7, 2020

(86) PCT No.: PCT/CN2020/074544
§ 371 (c)(1),
(2) Date: Oct. 28, 2021

(87) PCT Pub. No.: WO2020/220786
PCT Pub. Date: Nov. 5, 2020

(65) Prior Publication Data
US 2022/0243705 A1     Aug. 4, 2022

(30) Foreign Application Priority Data
Apr. 30, 2019  (CN) .......................... 201910364167.9

(51) Int. Cl.
*H02K 7/18*     (2006.01)
*F03D 80/60*   (2016.01)
(Continued)

(52) U.S. Cl.
CPC ............. *H02K 7/183* (2013.01); *F03D 80/60* (2016.05); *H02K 9/10* (2013.01); *H02K 9/18* (2013.01); *H02K 9/19* (2013.01); *F05B 2260/20* (2013.01)

(58) Field of Classification Search
CPC ............ H02K 7/183; H02K 9/10; H02K 9/18; H02K 9/19; H02K 7/1838; F03D 80/60; F05B 2260/20
See application file for complete search history.

(56) References Cited

U.S. PATENT DOCUMENTS 4,657,290 A * 4/1987 Linden .................... F02B 77/11
                                                              290/2
4,736,111 A * 4/1988 Linden .................... F02B 63/04
                                                              290/2
(Continued)

FOREIGN PATENT DOCUMENTS

| CN | 104009588 A | 8/2014 |
| CN | 106939877 A | 7/2017 |

(Continued)

OTHER PUBLICATIONS

International Search Report dated Apr. 22, 2020; PCT/CN2020/074544.
(Continued)

*Primary Examiner* — Pedro J Cuevas

(57) ABSTRACT

The present application discloses a heat exchange system and a motor. The heat exchange system includes: a first heat exchange unit disposed in a to-be-cooled area of the motor for heat exchange, the first heat exchange unit including a plurality of first heat exchange branches connected in parallel; a second heat exchange unit disposed outside the motor, and being connected to the first heat exchange unit through a pipeline assembly to form a closed heat exchange loop. Each first heat exchange branch is connected with a (Continued)

first heat exchanger, a first valve group, and a first pressure information component, and the opening and closing of the first valve group is controlled according to the first pressure information of the first pressure information component.

20 Claims, 6 Drawing Sheets

(51) Int. Cl.
*H02K 9/18* (2006.01)
*H02K 9/19* (2006.01)
*H02K 9/10* (2006.01)

(56) References Cited

U.S. PATENT DOCUMENTS

| | | | | |
|---|---|---|---|---|
| 5,323,061 | A * | 6/1994 | Immler | F24D 11/0235 290/1 R |
| 6,525,431 | B1 * | 2/2003 | Clucas | F24D 11/002 290/1 R |
| 7,040,544 | B2 * | 5/2006 | Guyer | F24D 5/02 60/39.01 |
| 7,067,933 | B2 * | 6/2006 | Bassett | F02G 1/043 60/520 |
| 7,279,800 | B2 * | 10/2007 | Bassett | F23G 5/46 290/1 R |
| 7,466,034 | B2 * | 12/2008 | Kang | F24F 1/06 290/40 C |
| 8,344,528 | B2 * | 1/2013 | Bassett | F23D 11/106 290/1 R |
| 8,601,804 | B2 * | 12/2013 | Akashi | F03D 80/60 60/494 |
| 8,632,303 | B2 * | 1/2014 | Akashi | F03D 80/60 415/176 |
| 8,635,870 | B2 * | 1/2014 | Kasuya | F01K 23/065 60/671 |
| 9,404,417 | B2 * | 8/2016 | Norrick | F02B 77/11 |
| 9,644,853 | B2 * | 5/2017 | Kawano | F02B 63/044 |
| 9,803,584 | B2 * | 10/2017 | Schmalz | F02B 43/02 |
| 9,945,566 | B2 * | 4/2018 | Park | F24D 3/08 |
| 10,075,115 | B2 * | 9/2018 | Pepe | G05D 23/1923 |
| 10,180,116 | B2 * | 1/2019 | Park | F24D 17/0031 |
| 10,955,168 | B2 * | 3/2021 | Warren | F24H 9/1836 |
| 11,352,930 | B2 * | 6/2022 | Warren | F01N 5/02 |
| 2005/0134125 | A1 | 6/2005 | Kim | |
| 2011/0000407 | A1 * | 1/2011 | Bassett | F01K 7/38 110/238 |
| 2012/0025533 | A1 | 2/2012 | Casazza et al. | |
| 2012/0124984 | A1 * | 5/2012 | Akashi | F03D 15/20 60/398 |
| 2012/0148407 | A1 * | 6/2012 | Akashi | F03D 9/28 416/95 |
| 2023/0150353 | A1 * | 5/2023 | Singh | B60K 7/0007 180/65.6 |

FOREIGN PATENT DOCUMENTS

| | | |
|---|---|---|
| CN | 107196461 A | 9/2017 |
| CN | 108541188 A | 9/2018 |
| CN | 109441740 A | 3/2019 |
| EP | 2 530 312 A2 | 12/2012 |

OTHER PUBLICATIONS

The Second Chinese Office Action dated Oct. 18, 2022; Appln. No. 201910364167.9 (Concise Explanation of Relevance for CN—OA2—1 paragraph).
First Australian Office Action dated Aug. 23, 2022; Appln. No. 2020266630.
First Chinese Action dated Mar. 21, 2022; Appln. No. 201910364167. 9.
Extended European Search Report dated May 20, 2022; Appln. No. 20798309.9.
First Indian Office Action dated Mar. 14, 2022; Appln. No. 202117049656.
Australian Examination Report No. 2 dated Mar. 28, 2023; Appln. No. 2020266630.

* cited by examiner

HEAT EXCHANGE SYSTEM AND MOTOR

CROSS REFERENCE TO RELATED APPLICATION

The present application is a national phase of PCT Application No. PCT/CN2020/074544 filed on Feb. 7, 2020, which claims priority to Chinese Patent Application No. 201910364167.9, tilted "HEAT EXCHANGE SYSTEM AND MOTOR" and filed on Apr. 30, 2019, both of which are hereby incorporated by reference in their entireties.

TECHNICAL FIELD

The present disclosure relates to a technical field of heat exchange, and particularly relates to a heat exchange system and a motor.

BACKGROUND

Wind power technology is a key technology for the development of renewable energy. During operation of a motor in a wind turbine generator, there is a heat loss mainly derived from electromagnetic loss. The heat loss mainly includes Joule heat due to ohmic impedance in the winding, hysteresis loss and eddy current loss in the iron core, and unavoidable stray loss.

As the development of wind energy continues to increase, the installed unit capacity of the wind power generator is constantly increasing. The increase in the unit capacity will directly bring about the continuous increase of the heat loss of the wind power generator. As an important part of the wind power generator, a cooling system can take away the heat generated by the wind power generator to a certain extent, so that the wind power generator can run smoothly.

However, the existing cooling system of the wind power generator has a complicated structure, cannot operate fault tolerantly, and has low reliability.

SUMMARY

The present application provides a heat exchange system and a motor, to improve the reliability of the heat exchange system.

On one aspect, the present application provides a heat exchange system for cooling heat-generating components of a motor, the heat exchange system including: a first heat exchange unit, placed in an area to be cooled of the motor to exchange heat and including a plurality of first heat exchange branches connected in parallel with each other; a second heat exchange unit, arranged outside the motor and being communicated with the first heat exchange unit through a pipeline assembly to form a closed-loop heat exchange circuit, wherein each of the first heat exchange branches is provided with a first heat exchanger, a first valve group and a first pressure information component, and opening and closing of the first valve group is controlled according to first pressure information from the first pressure information component.

According to the above embodiment on one aspect of the present application, the first heat exchanger is arranged in the area to be cooled; the first valve group includes at least two first valves, an inlet end and an outlet end of the first heat exchange branch are respectively provided with the first valves; the first pressure information component includes at least two first pressure transmitters, an inlet end and an outlet end of the first heat exchanger are respectively provided with the first pressure transmitters, and the at least two first pressure transmitters output the first pressure information.

According to the above embodiment on one aspect of the present application, the first heat exchange unit further includes a supply main pipe and a return main pipe, and the plurality of the first heat exchange branches is communicated with the supply main pipe and the return main pipe respectively, wherein the supply main pipe and the return main pipe are both tubes in form of rings, and the plurality of first heat exchange branches are evenly distributed on outer peripheries of the supply main pipe and the return main pipe; and the plurality of the first heat exchange branches are arranged with the same path.

According to the above embodiment on one aspect of the present application, the heat exchange system further includes: a pump unit, communicated into the closed-loop heat exchange circuit through the pipeline assembly, and including two or more pump branches arranged in parallel, each of the pump branches being provided with a pump, a second valve group and a first differential pressure transmitter, and opening and closing of the second valve group being controlled according to first differential pressure information from the first differential pressure transmitter.

According to the above embodiment on one aspect of the present application, the second valve group includes at least two second valves, and an inlet end and an outlet end of the pump branch are respectively provided with the second valves; the first differential pressure transmitter is connected to an inlet end and an outlet end of the pump.

According to the above embodiment on one aspect of the present application, the second heat exchange unit includes two or more second heat exchange branches arranged in parallel, and each of the second heat exchange branches is provided with a second heat exchanger, a third valve group, and a second pressure information component, and opening and closing of the third valve group is controlled according to second pressure information from the second pressure information component.

According to the above embodiment on one aspect of the present application, the second heat exchanger is arranged outside the motor; the third valve group includes at least two third valves, an inlet end and an outlet end of the second heat exchange branch are respectively provided with the third valves; the second pressure information component includes at least two second pressure transmitters, an inlet end and an outlet end of the second heat exchanger are respectively provided with the second pressure transmitters, and the at least two second pressure transmitters output the second pressure information.

According to the above embodiment on one aspect of the present application, the heat exchange system further includes a controller, each of the first heat exchange branches is provided with a first flow transmitter, the first flow transmitter is connected to the controller, and the controller controls an opening degree of the first valve group according to first flow information from the first flow transmitter; and each of the second heat exchange branches is provided with a second flow transmitter, the second flow transmitter is connected to the controller, and the controller controls an opening degree of the second valve group according to second flow information from the second flow transmitter.

According to the above embodiment on one aspect of the present application, at least one of the pipeline assembly, the supply main pipe, and the return main pipe is connected with a third temperature transmitter, the supply main pipe is provided with a first temperature transmitter, and the return main pipe is provided with a second temperature transmitter, the third flow transmitter, the first temperature transmitter, and the second temperature transmitter are connected to the controller, and the controller obtains a total heat dissipation amount of the heat exchange system according to the first flow information from the first flow transmitter, the second flow information from the second flow transmitter, third flow information from the third flow transmitter, first temperature information from the first temperature transmitter, and second temperature information from the second temperature transmitter.

According to the above embodiment on one aspect of the present application, each of the first heat exchange branches is provided with a first fan in air communication with the first heat exchanger, each of the second heat exchange branches is provided with a second fan in air communication with the second heat exchanger, and the first fan and the second fan are connected to the controller; the heat exchange system further includes a stator temperature transmitter connected to a stator of the motor, a rotor temperature transmitter connected to a rotor of the motor, and an environmental temperature transmitter and a wind speed sensor arranged outside of the motor, the stator temperature transmitter, the rotor temperature transmitter, the environmental temperature transmitter and the wind speed sensor are connected to the controller, and the controller controls rotation speeds of the first fan, the second fan and the pump according to stator temperature information from the stator temperature transmitter, rotor temperature information from the rotor temperature transmitter, environmental temperature information from the environmental temperature transmitter, and wind speed information from the wind speed sensor.

According to the above embodiment on one aspect of the present application, the controller includes an accumulated data processing module, and the accumulated data processing module continuously collects rotation speed combination information and the corresponding power consumption information formed by the first fan, the second fan and the pump under different rotation speed combinations, and establishes a mapping model to different total heat dissipation amounts, and according to each of the total heat dissipation amounts in the mapping model in real time, the cumulative data processing module controls the rotational speeds of the first fan, the second fan, and the pump with the rotational speed combination information corresponding to the power consumption information of lowest power consumption.

According to the above embodiment on one aspect of the present application, the pipeline assembly includes a first pipeline, a second pipeline and a third pipeline, the first pipeline connects the pump unit with the supply main pipe, and the second pipeline connects the return main pipe with the second heat exchange unit, and the third pipeline connects the second heat exchange unit with the pump unit.

According to the above embodiment on one aspect of the present application, the heat exchange system further includes a controller, the controller is connected with the respective valves on the first pipeline, the second pipeline and the third pipeline, the first pipeline is provided with a safety relief device, and the safety relief device is connected to controller; the third pipeline is provided with a quality detection device, and the quality detection device is connected to the controller; the third pipeline is provided with an injection-discharge-filtration device and a second differential pressure transmitter, the injection-discharge-filtration device is adapted for injection, discharge and filtration of medium in the third pipeline, the second differential pressure transmitter is connected to an inlet end and an outlet end of the injection-discharge-filtration device, and the second differential pressure transmitter is connected to the controller.

According to the above embodiment on one aspect of the present application, each of the pump branches is provided with a check valve, and the check valve is located downstream of the pump; each of the pump branches is provided with a pressure stabilizing device, and the pressure stabilizing device is located upstream of the pump; each of the pump branches is provided with a first gas exhaust device; each of the pump branches is provided with a first leakage detection device, the heat exchange system further includes a controller, and the first leakage detection device is connected to the controller.

According to the above embodiment on one aspect of the present application, the heat exchange system further includes a controller, each of the first heat exchange branches is provided with a second liquid leakage detection device, and the second liquid leakage detection device is connected to the controller; each of the second heat exchange branches is provided with a second gas exhaust device; each of the second heat exchangers is connected with a third liquid leakage detection device, and the third liquid leakage detection device is connected to the controller.

On a further aspect, the embodiments of the present application provide a motor including the heat exchange system according to any of the above embodiments, wherein the first heat exchange unit of the heat exchange system is integrated in the area to be cooled of the motor.

In the motor and heat exchange system according to the embodiments of the present application, the first heat exchange unit is placed the area to be cooled of the motor to exchange heat, wherein the first heat exchange unit includes a plurality of first heat exchange branches connected in parallel with each other, each of the first heat exchange branches is provided with a first heat exchanger, a first valve group and a first pressure information component. The first pressure information component can obtain the pressure change information and pressure resistance change information between the inlet and outlet ends of the first heat exchanger on the corresponding first heat exchange branch, and by pressure calculation, the blocking condition of the first heat exchanger on the corresponding first heat exchange branch can be determined. The first valve group can quickly switch the corresponding first heat exchange branch into or out of the heat exchange system by opening and closing actions. The opening and closing of the first valve group in each first heat exchange branch is controlled according to the first pressure information of the first pressure information component. For example, when it is obtained that the corresponding first heat exchanger is blocked according to the first pressure information, the first valve group is controlled to switch the first heat exchange branch out of the system. Since the first heat exchange unit includes a plurality of first heat exchange branches connected in parallel with each other, and the remaining normal working first heat exchange branches can continue to complete the work of cooling the heat-generating components of the motor, the fault tolerance capacity and reliability of the heat exchange system is improved.

BRIEF DESCRIPTION OF THE DRAWINGS

By reading the following detailed description of the non-limiting embodiments with reference to the accompanying drawings, other features, purposes and advantages of the present application will become more apparent, wherein the same or similar reference signs indicate the same or similar features.

Figure 1:
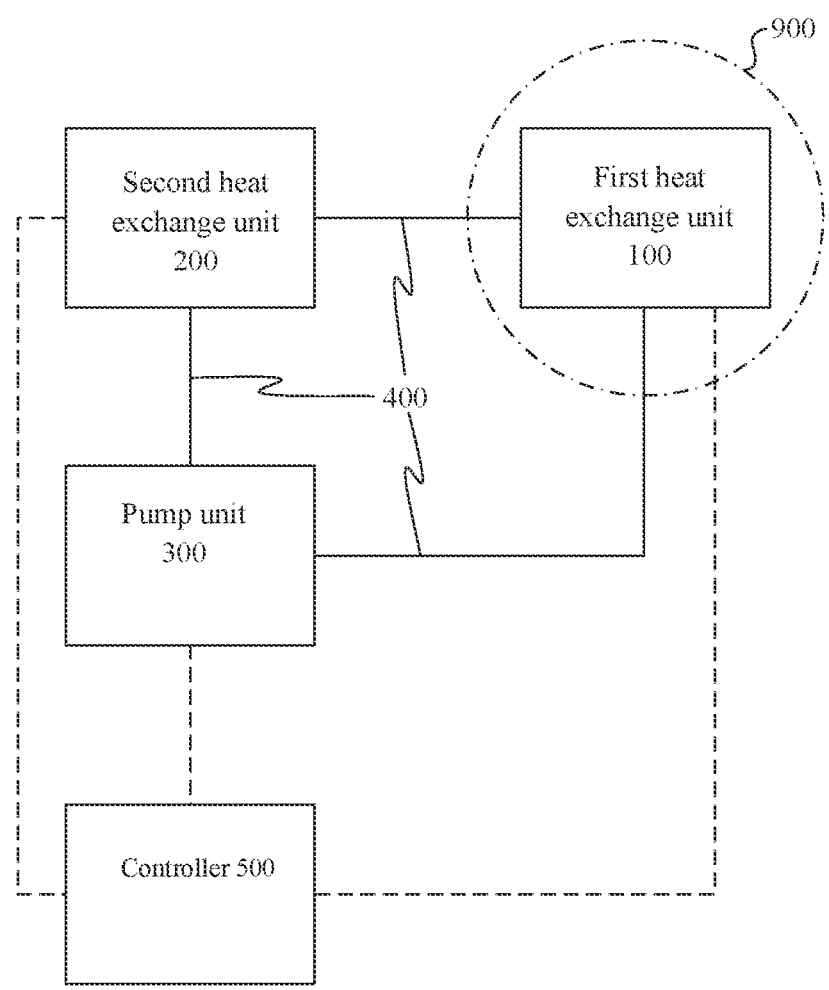
FIG. 1 is a structural block diagram of a heat exchange system according to an embodiment of the present application.

In the accompanying drawings:
- 100—first heat exchange unit;
- 110—supply main pipe; 111—first temperature transmitter;
- 120—return main pipe; 121—second temperature transmitter;
- 130—first heat exchange branch; 131—first heat exchanger; 132—first valve; 133—first pressure transmitter; 134—first flow transmitter; 135—first fan; 136—second leakage detection device; 137—third temperature transmitter;
- 101—third gas exhaust device; 102—seventh valve; 103—eighth valve;
- 200—second heat exchange unit;
- 210—second heat exchange branch; 211—second heat exchanger; 212—third valve; 213—second pressure transmitter; 214—second flow transmitter; 215—second fan; 216—second gas exhaust device; 217—third leakage detection device; 218—fourth temperature transmitter;
- 300—pump unit;
- 310—pump branch; 311—pump; 312—second valve; 313—first differential pressure transmitter; 314—check valve; 315—pressure stabilizing device; 316—first gas exhaust device; 317—first leakage detection device;
- 400—pipeline assembly;
- 410—first pipeline; 411—safety relief device; 412—fourth valve; 413—pressure gauge;
- 420—second pipeline; 421—fifth valve;
- 430—third pipeline; 431—sixth valve; 432—quality detection device; 433—injection-discharge-filtration device; 434—second differential pressure transmitter;
- 401—third flow transmitter; 402—third pressure transmitter; 403—fifth temperature transmitter;
- 500—controller; 510—accumulated data processing module;
- 600—serial server; 700—host computer;
- 800—wireless communication module;
- 900—motor;
- TS—stator temperature transmitter;
- TR—rotor temperature transmitter;
- TA—environment temperature transmitter;
- VA—wind speed sensor.

DETAILED DESCRIPTION

In order to make the objectives, technical solutions, and advantages of the present application clearer, the present application is further described in detail with reference to the accompanying drawings and specific embodiments below. It should be understood that the specific embodiments described here are only intended to explain the present application, and not intended to limit the present application. For the person skilled in the art, the present application may be implemented without some of these specific details.

It should be noted that in the present application, relational terms such as first and second are only used to distinguish one entity or operation from another entity or operation, and do not necessarily require or imply any such actual relationship or order between the entities or operations. Moreover, the terms "include", "including" or any other variants thereof are intended to cover non-exclusive inclusion, so that a process, method, article or device including a series of elements not only includes these elements, but also includes other elements that are not explicitly listed, or further includes elements inherent to the process, method, article or device. If there are no more restrictions, the element defined by the expression "include . . . " does not exclude the existence of other same elements in the process, method, article, or device that includes said element.

The present application provides a heat exchange system; in some embodiments, the heat exchange system is used to cool some certain components, and in some other embodiments, the heat exchange system is used to heat some certain components. In the following embodiments, description is made by taking the heat exchange system used to cool the heat-generating components of the motor as an example.

Figure 2:
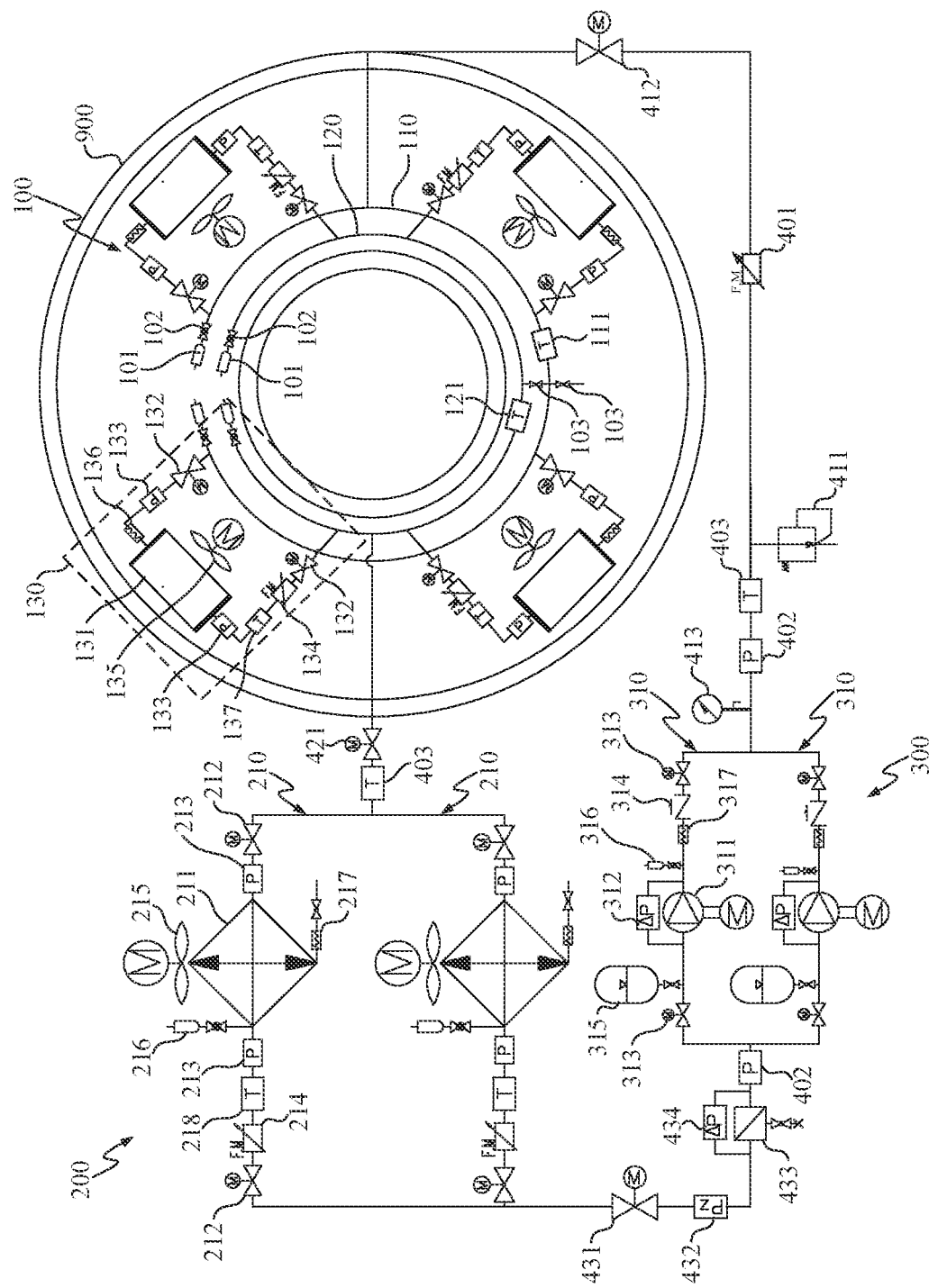
FIG. 2 is a schematic structural diagram of a heat exchange system according to an embodiment of the present application.

FIG. 1 and FIG. 2 are respectively a structural block diagram and a structural schematic diagram showing a heat exchange system according to an embodiment of the present application, wherein the heat exchange system includes a first heat exchange unit 100 and a second heat exchange unit 200, and the first heat exchange unit 100 and the second heat exchange unit 200 are connected by a pipeline assembly 400 to form a closed-loop heat exchange circuit.

The first heat exchange unit 100 is placed in an area to-be-cooled of a motor 900 to exchange heat, so as to cool the heat-generating components of the motor 900. The second heat exchange unit 200 is arranged outside the motor 900. Each first heat exchange branch 130 is provided with a first heat exchanger 131, a first valve group, and a first pressure information component, and the opening and closing of the first valve group is controlled according to a first pressure information from the first pressure information component.

The first pressure information component can obtain pressure change information and pressure resistance change information between an inlet and an outlet of the first heat exchanger 131 in the corresponding first heat exchange branch 130, and by pressure calculation, the blocking condition of first heat exchanger 131 in the corresponding first heat exchange branch 130 can be determined. The first valve group can quickly switch the corresponding first heat exchange branch 130 into or out of the heat exchange system by opening or closing actions. The opening and closing of the first valve group in each first heat exchange branch 130 can be controlled according to the first pressure information from the first pressure information component; for example, when it is determined that the corresponding first heat exchanger 131 is blocked according to the first pressure information, the first valve group is controlled to switch the first heat exchange branch 130 out of the system; since the first heat exchange unit 100 includes a plurality of first heat exchange branches 130 arranged in parallel with each other, the remaining first heat exchange branches 130 that work normally can continue to complete the work of cooling the heat-generating components of the motor 900, thereby improving the fault tolerance capability and reliability of the heat exchange system.

In some embodiments, the first pressure information may be the detected pressures at the inlet and outlet of the corresponding first heat exchanger 131, and when the difference between the pressures is greater than or equal to a preset value, it means that the first heat exchanger 131 in the corresponding first heat exchange branch 130 is blocked. In some other embodiments, the first pressure information may be other pressure information or pressure resistance information related to the corresponding first heat exchanger 131, so as to determine whether the corresponding first heat exchanger 131 is blocked in other ways.

In some embodiments, at the first heat exchange unit 100, a circulating first medium may be provided to continuously exchange heat with the heat-generating components of the motor 900; after exchanging heat with the heat-generating components, the first medium exchanges heat with a second medium at the first heat exchanger 131; and the cooled first medium continues to circulate and exchanges heat with the heat-generating components. In some embodiments, at the first heat exchange unit 100, the first heat exchanger 131 may be directly connected to the heat-generating components, so that the heat-generating components directly exchange heat with the second medium.

After exchanging heat in the first heat exchange unit 100, the above-mentioned second medium can be transported to the second heat exchange unit 200 through the pipeline assembly 400. At the second heat exchange unit 200, the second medium may be re-cooled by, for example, exchanging heat with a third medium. The cooled second medium may be circulated and transported to the first heat exchange unit 100 through the pipeline assembly 400.

As shown in FIG. 1, in some embodiments, the heat exchange system further includes a pump unit 300, and the pump unit 300 is connected into the closed-loop heat exchange circuit through the pipeline assembly 400. The pump unit 300 may be used to drive the above-mentioned second medium to circulate in the closed-loop heat exchange circuit.

As shown in FIG. 1, in some embodiments, the heat exchange system further includes a controller 500, and the controller 500 may be connected with the first heat exchange unit 100, the second heat exchange unit 200, and the pump unit 300. Specifically, the controller 500 may be electrically and signally connected with several devices in the first heat exchange unit 100, several devices in the second heat exchange unit 200, and several devices in the pump unit 300, and in FIG. 1, the connection relationship of the controller 500 with the first heat exchange unit 100, the second heat exchange unit 200, and the pump unit 300 is shown by dotted lines. In some embodiments, the pipeline assembly 400 may also be provided with several devices, and the several devices may also be electrically and signally connected with the controller 500.

Figure 3:
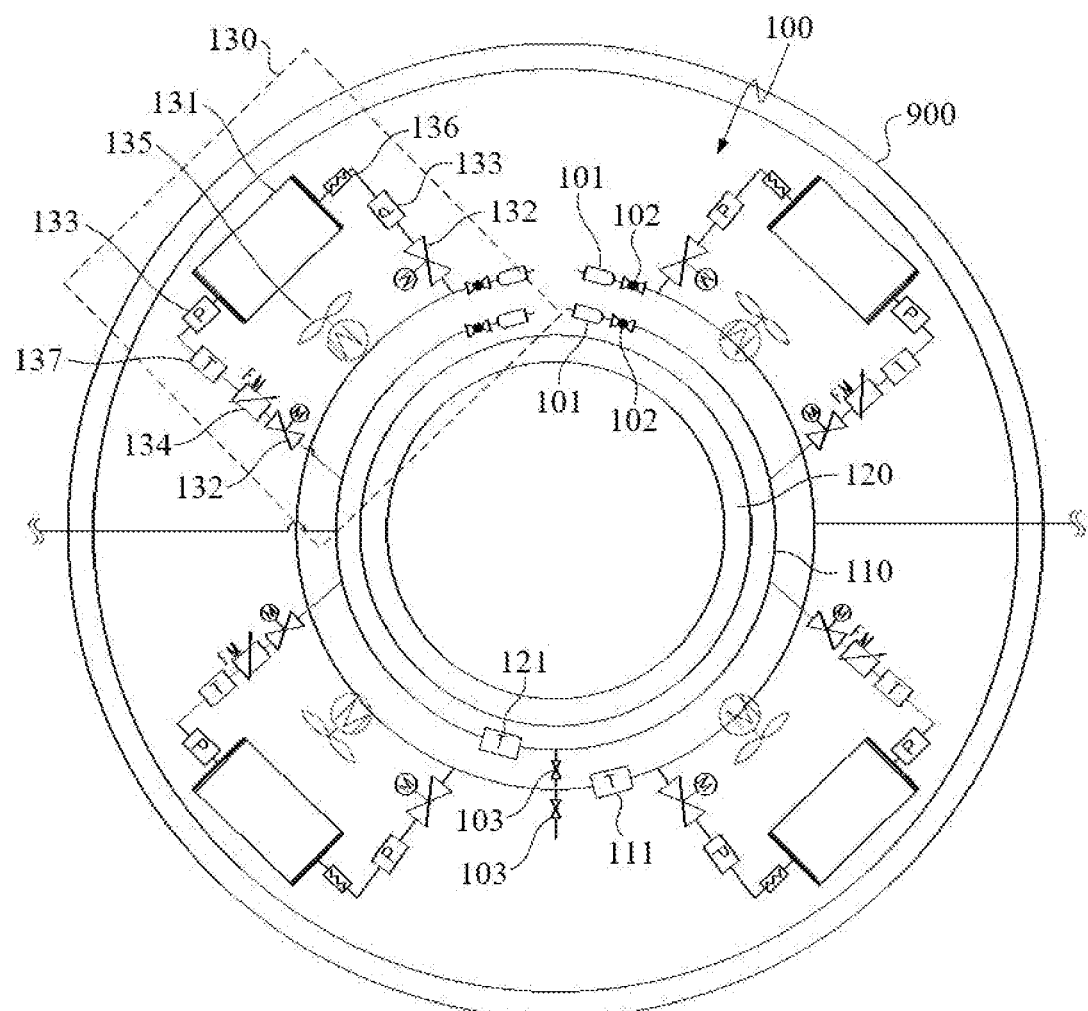
FIG. 3 is a schematic structural diagram of a first heat exchange unit in a heat exchange system according to an embodiment of the present application.

FIG. 3 is a schematic structural diagram of a first heat exchange unit in a heat exchange system according to an embodiment of the present application. The first heat exchanger 131 is disposed in the area to be cooled; in some embodiments, the first heat exchanger 131 may be disposed inside a support bracket of the motor 900 or outside the motor 900. As mentioned above, the first heat exchanger 131 in each first heat exchange branch 130 includes the first pressure information component and the first valve group. The first valve group includes at least two first valves 132, and an inlet end and an outlet end of the first heat exchange branch 130 are respectively provided with the first valves 132. The first pressure information component includes at least two first pressure transmitters 133, an inlet end and an outlet end of the first heat exchanger 131 are respectively provided with the first pressure transmitters 133, and the at least two first pressure transmitters 133 are adapted to output the first pressure information.

In some embodiments, the first pressure information component and the first valve group are connected with the controller 500, and the controller 500 controls the opening and closing of the first valve group according to the first pressure information from the first pressure information component, thereby automatically controlling the switching-in and switching-out of the first heat exchange branch 130 in the heat exchange system.

In some embodiments, the first heat exchange unit 100 further includes a supply main pipe 110 and a return main pipe 120, and a plurality of first heat exchange branches 130 are respectively connected to the supply main pipe 110 and the return main pipe 120. The supply main pipe 110 is communicated with the pump unit 300 through the pipeline assembly 400, and the return main pipe 120 is communicated with the second heat exchange unit 200 through the pipeline assembly 400. In some other embodiments, the supply main pipe 110 may be communicated with the second heat exchange unit 200 through the pipeline assembly 400, and the return main pipe 120 may be communicated with the pump unit 300 through the pipeline assembly 400.

As shown in FIG. 2 and FIG. 3, in some embodiments, the supply main pipe 110 and the return main pipe 120 are both tubes in form of rings, and the plurality of first heat exchange branches 130 are evenly distributed on outer peripheries of the supply main pipe 110 and the return main pipe 120. The plurality of first heat exchange branches 130 are arranged with the same path to ensure that the flow paths of the second medium passing through the respective first heat exchange branches 130 arranged in parallel are consistent, thereby achieving the flow uniformity of the respective first heat exchange branches 130 and improving the uniformity of heat dissipation.

Figure 4:
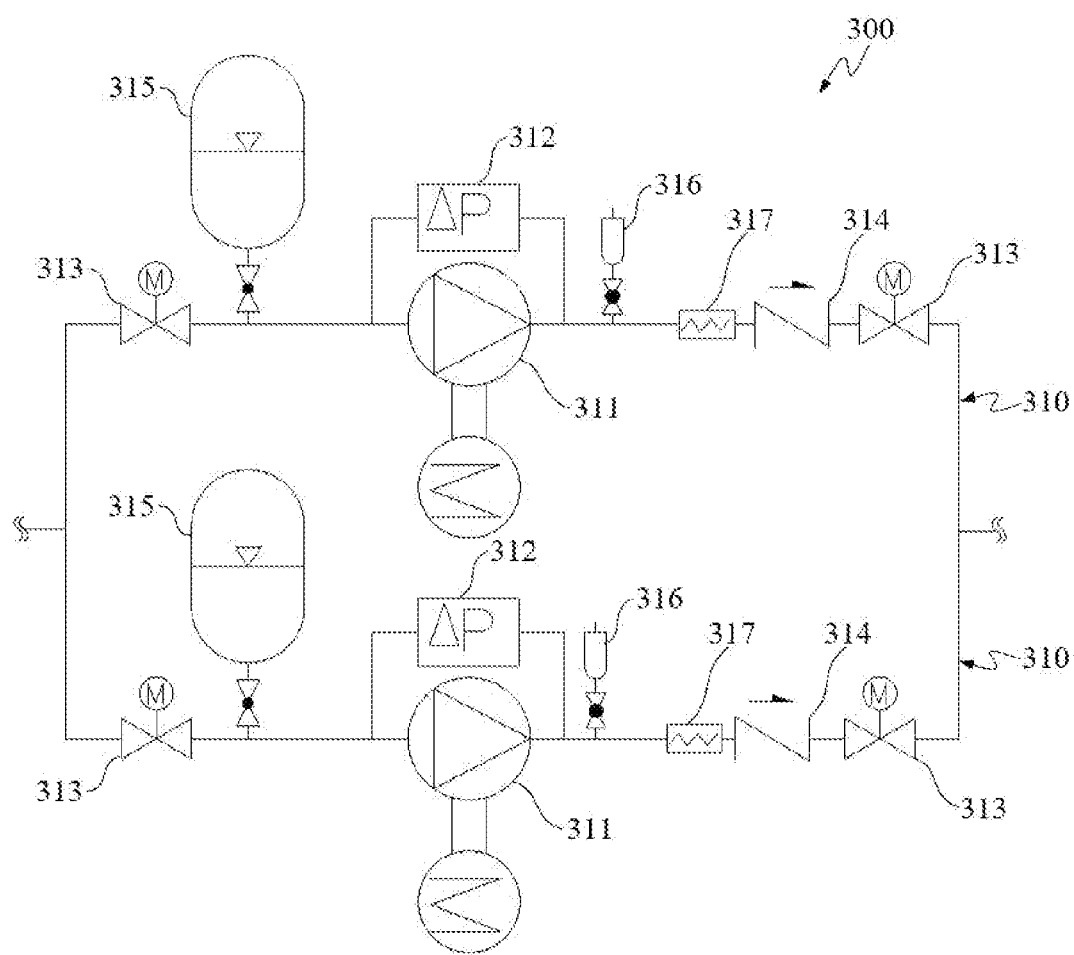
FIG. 4 is a schematic structural diagram of a pump group in a heat exchange system according to an embodiment of the present application.

FIG. 4 is a schematic structural diagram of a pump unit in a heat exchange system according to an embodiment of the present application. In some embodiments, the pump unit 300 includes two or more pump branches 310 arranged in parallel, each pump branch 310 is provided with a pump 311, a second valve group, and a first differential pressure transmitter 313, and the opening and closing of the second valve group is controlled according to a first differential pressure information from the first differential pressure transmitter 313.

The pump unit 300 includes, for example, two pump branches 310 arranged in parallel, and each pump branch 310 is provided with the pump 311. An operation mode of the pump unit 300 may be one-use and one-backup, that is, under working conditions, one of the pump branches 310 is in normal operation while the other pump branch 310 is switched out of the heat exchange system as a backup. When the pump branch 310 in normal operation fails, it is switched out of the system and the backup pump branch 310 is switched into the system to continue the operation of the heat exchange system. In some embodiments, the pump unit 300 may be operated in parallel at full load, thereby improving the fault-tolerant operation capability of the heat exchange system. The first differential pressure transmitter 313 on each pump branch 310 may monitor the operation and fault condition of the corresponding pump 311, and the second valve group facilitates the quick switching of the corresponding pump 311 into or out of the system, for example, the corresponding pump 311 is quickly switched out of the system when it fails.

As shown in FIG. 2 and FIG. 4, the second valve group may include at least two second valves 312, and an inlet end and an outlet end of the pump branch 310 are respectively provided with the second valves 312. The first differential pressure transmitters 313 are connected to an inlet end and an outlet end of the pump 311.

In some embodiments, the first differential pressure transmitter 313 and the second valve group are connected to the controller 500, and the controller 500 controls the opening and closing of the second valve group according to the first differential pressure information from the first differential pressure transmitter 313, so as to automatically control the switching-in and switching-out of the pump branch 310 in the heat exchange system.

In some embodiments, the operation mode of the pump unit 300 is one-use and one-backup, and under normal operating condition, the first differential pressure transmitter 313 connected to the inlet and outlet ends of the pump 311 is used to monitor the fault operating condition of the corresponding pump 311. When the pressure difference between the inlet and the outlet ends of the pump 311 is lower than a preset value, the first differential pressure transmitter 313 feed backs the failure of the pump 311, and in addition, an alarm can be given. At the same time, the controller 500 switches the pump 311 of the other pump branch 310 into the system for operation, shuts down the faulty pump 311, closes the second valves 312 on the pump branch 310 where the faulty pump 311 is located, and switches the faulty pump 311 out of the system without affecting the normal operation of the system.

The above is only one example in which the controller 500 controls the opening and closing of the second valve group according to the first differential pressure information from the first differential pressure transmitter 313. In some other embodiments, other reasonable methods may be used for controlling of the switching-in and switching-out of the pump branch 310.

Figure 5:
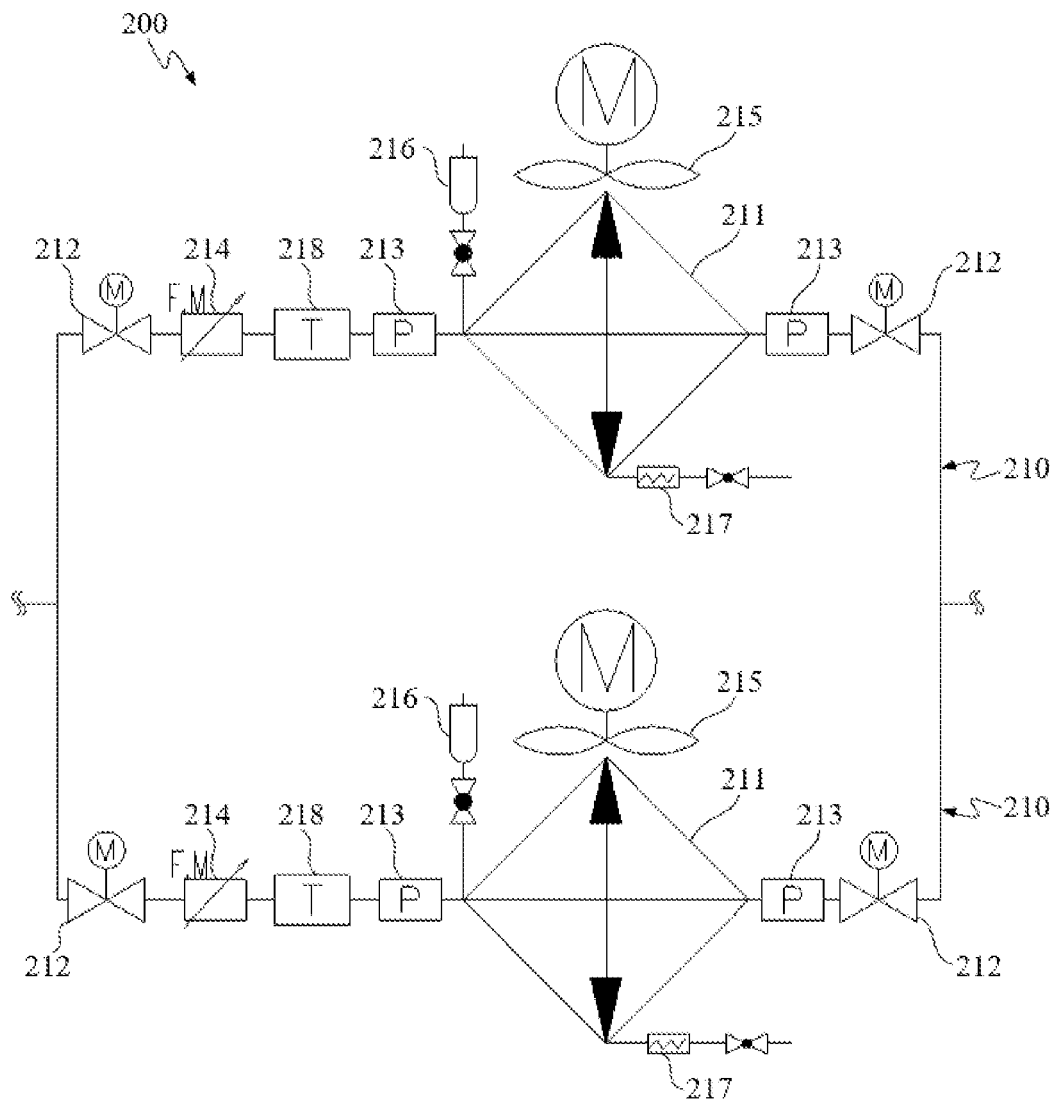
FIG. 5 is a schematic structural diagram of a second heat exchange unit in a heat exchange system according to an embodiment of the present application.

FIG. 5 is a schematic structural diagram of a second heat exchange unit in a heat exchange system according to an embodiment of the present application. In some embodiments, the second heat exchange unit 200 includes two or more second heat exchange branches 210 arranged in parallel. Each heat exchange branch 210 is provided with a second heat exchanger 211, a third valve group and a second pressure information component, and the opening and closing of the third valve group is controlled according to second pressure information from the second pressure information component.

The second pressure information component can obtain pressure change information and pressure resistance change information between an inlet and an outlet of the second heat exchanger 211 on the second heat exchange branch 210, and by pressure calculation, the blocking condition of the second heat exchanger 211 on the corresponding second heat exchange branch 210 can be determined. The third valve group can quickly switch the corresponding second heat exchange branch 210 into or out of the heat exchange system by opening and closing actions. The opening and closing of the third valve group in each second heat exchange branch 210 is controlled according to the second pressure information from the second pressure information component; for example, when it is determined that the corresponding second heat exchanger 210 is blocked according to the second pressure information, the third valve group is controlled to switch the second heat exchange branch 210 out of the system; since the second heat exchange unit 200 includes a plurality of second heat exchange branches 210 arranged in parallel with each other, the remaining normal working second heat exchange branches 210 can continue to complete the work of cooling the second medium, thereby improving the fault tolerance capability and reliability of the heat exchange system.

As shown in FIG. 2 and FIG. 5, in some embodiments, the second heat exchanger 211 is provided outside the motor 900. The third valve group includes at least two third valves 212, and an inlet end and an outlet end of the second heat exchange branch 210 are respectively provided with the third valves 212. The second pressure information component includes at least two second pressure transmitters 213, an inlet end and an outlet end of the second heat exchanger 211 are respectively provided with the second pressure transmitters 213, and the at least two second pressure transmitters 213 are adapted to output the above-mentioned second pressure information.

In some implementations, the second pressure information component and the third valve group are connected to the controller 500, and the controller 500 controls the opening and closing of the third valve group according to the second pressure information from the second pressure information component, thereby automatically controlling the switching-in and switching-out of the second heat exchange branch 210 in the heat exchange system.

Figure 6:
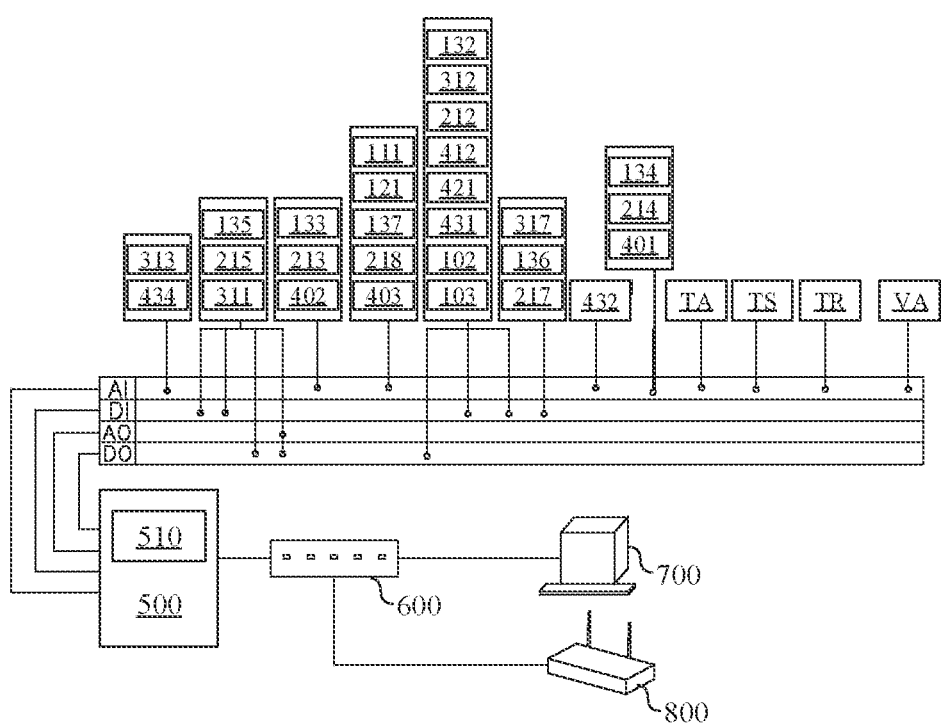
FIG. 6 is a schematic diagram of the connection between various devices and the controller in the heat exchange system according to an embodiment of the present application.

FIG. 6 is a schematic diagram of connection between various devices and a controller in the heat exchange system according to an embodiment of the present application. The controller 500 is connected to four kinds of signal lines, namely: analog signal input line AI, digital signal input line DI, analog signal output line AO, and digital signal output line DO. In FIG. 6, the various devices in the heat exchange system are connected to the respective corresponding signal lines to be electrically or signally connected to the controller 500.

In some embodiments, each first heat exchange branch 130 is provided with a first flow transmitter 134, the first flow transmitter 134 is connected to the controller 500, and the controller 500 controls an opening degree of the first valve group according to first flow information from the first flow transmitter 134.

In some embodiments, each second heat exchange branch 210 is provided with a second flow transmitter 214, the second flow transmitter 214 is connected to the controller 500, and the controller 500 controls an opening degree of the second valve group according to second flow information from the second flow transmitter 234.

In some embodiments, at least one of the pipeline assembly 400, the supply main pipe 110 and the return main pipe 120 is provided with a third flow transmitter 401, the supply main pipe 110 is provided with a first temperature transmitter 111, and the return main pipe 120 is provided with a second temperature transmitter 121.

The third flow transmitter 401, the first temperature transmitter 111, and the second temperature transmitter 121 are connected with the controller 500, and the controller 500 obtains a total heat dissipation amount according to the first flow information from the first flow transmitter 134, the second flow information from the second flow transmitter 214, the third flow information from the third flow transmitter 401, first temperature information from the first temperature transmitter 111, and second temperature information from the second temperature transmitter 121.

The first flow transmitter 134, the second flow transmitter 214, and the third flow transmitter 401 feed back signals through the digital signal input line DI, and the controller 500 determines whether it is uniform across the respective first heat exchange branches 130 and across the respective second heat exchange branches 210, and ensures that the flow of the respective branches are uniform by combining with adjustment of the opening degrees of the first valve groups and the second valve groups, thereby ensuring the uniformity of heat dissipation in the heat exchange system. In addition, by combining with the third flow transmitter 401 on the main pipe, the first temperature transmitter 111 on the supply main pipe 110, and the second temperature transmitter 121 on the return main pipe 120, statistics of the total heat dissipation amount of the heat exchange system are achieved.

In some embodiments, each first heat exchange branch 130 is provided with a third temperature transmitter 137, each second heat exchange branch 210 is provided with a fourth temperature transmitter 218, and the pipeline assembly 400 is provided with at least one fifth temperature transmitter 403. The third temperature transmitter 137, the fourth temperature transmitter 218, and the fifth temperature transmitter 403 are all connected with the controller 500, so as to provide more accurate statistics of the heat dissipation amount.

In some embodiments, the first heat exchanger 131 may be a gas-liquid heat exchanger, that is, the first medium is a circulating gas medium while the second medium is a circulating liquid medium, and the second medium is, for example, a cooling liquid, and also may be a liquid medium such as water. The second heat exchanger 211 also may be a gas-liquid heat exchanger, that is, the third medium is a gas medium. The first heat exchanger 131 and the second heat exchanger 211 may be plate-fin heat exchangers, tube-fin radiators, tube-and-tube heat exchangers, etc.

In some embodiments, each first heat exchange branch 130 is provided with a first fan 135 in air communication with the first heat exchanger 131, and in the area to be cooled where the first heat exchanger 131 is located, the first fan 135 can provide a driving force for the circulation of the first medium. Each second heat exchange branch 210 is provided with a second fan 215 in air communication with the second heat exchanger 211, and the second fan 215 can improve the heat exchange efficiency of the second heat exchanger 211. In some other embodiments, in the case that the heat dissipation amount is satisfied, the second fan 215 may not be provided at the second heat exchanger 211, and the second medium is cooled in a passive heat dissipation manner. Alternatively, in some other embodiments, the second fan 215 is employed to enhance heat dissipation of a corresponding part of the second heat exchanger 211, so that the second heat exchanger 211 performs heat exchange in a combination of active and passive heat dissipation manners. By increasing the proportion of passive heat dissipation applied at the second heat exchanger 211, increasing the utilization of natural wind, and reducing the self-power consumption of the heat exchange system, the energy efficiency ratio of the system can be increased, and the energy-saving performance of the system can be improved.

In some embodiments, the first fan 135 and the second fan 215 are respectively driven by motors such as variable frequency motors and multi-stage power frequency motors; and the pump 311 is driven by a motor such as a variable frequency motor and a multi-stage power frequency motor. In some embodiments, the first fan 135, the second fan 215, and the pump 311 are connected to the controller 500.

The motor 900 may include a stator and a rotor. As shown in FIG. 6, the heat exchange system may further include a stator temperature transmitter TS connected to the stator of the motor 900, a rotor temperature transmitter TR connected to the rotor of the motor 900, and an environmental temperature transmitter TA and a wind speed sensor VA arranged outside the motor 900. The stator temperature transmitter TS, the rotor temperature transmitter TR, the environmental temperature transmitter TA and the wind speed sensor VA are connected to the controller 500, and the controller 500 controls rotation speeds of the first fan 135, the second fan 215 and the pump 311 according to stator temperature information from the stator temperature transmitter TS, rotor temperature information from the rotor temperature transmitter TR, environmental temperature information from the environmental temperature transmitter TA, and wind speed information from the wind speed sensor VA.

In some embodiments, the controller 500 is connected to a host computer 700 through the serial server 600, and the controller combines information obtained by the above-mentioned statistics of total heat dissipation amount, the wind speed information fed back by the wind speed sensor VA, the environmental temperature information fed back by the environmental temperature transmitter TA, and system load statistics made by the host computer 700, fits relationship curves between the heat dissipation capacity (heat dissipation amount) of the heat exchange system and the environmental temperature and the system load, and optimizes the control logic of the controller 500 through data accumulation.

In some embodiments, the controller 500 includes an accumulated data processing module 510, the accumulated data processing module 510 continuously collects rotation speed combination information and the corresponding power consumption information formed under different rotation speed combinations of the first fan 135, the second fan 215 and the pump 311, and establishes a mapping model to different total heat dissipation amounts. According to each of the total heat dissipation amounts in the mapping model in real time, the cumulative data processing module 510 controls the rotational speeds of the first fan 135, the second fan 215, and the pump 311 with the rotational speed combination information corresponding to the power consumption information of lowest power consumption.

The accumulated data processing module 510 in the controller 500, acting as a pre-control system and by long-term data accumulation, can determine by itself the combination of the lowest power consumption of the three groups of rotating components (the first fan 135, the second fan 215 and the pump 311) under different adjustment mechanisms, in the case that the heat dissipation requirements of the entire system is satisfied, so as to meet the heat dissipation requirements of the system with the current lowest power consumption, and improve the energy-saving performance of the heat exchange system.

Further, by long-term data accumulation and analysis, the controller 500 can continuously learn and solidify the optimal control logic, that is, optimize the above-mentioned mapping model by continuously collecting information, thereby continuously improving the energy-saving performance and intelligence thereof. The controller 500 may include a memory, and the mapping model may be stored in the memory and executed by the accumulated data processing module 510. In some embodiments, the mapping model is directly stored in a controller 500 of another heat exchange system, so as to perform intelligent control of the another heat exchange system.

In some embodiments, the first fan 135, the second fan 215, and the pump 311 feed back signals of normal operation status and fault status through the digital signal input line DI, and the controller 500 outputs start status and stop status signals for controlling the first fan 135, the second fan 215 and the pump 311 via the digital signal output line DO. When the first fan 135, the second fan 215, and the pump 311 are connected to the variable frequency motor, the controller 500 outputs signals for controlling the rotation speeds through the analog signal output line AO; and when the first fan 135, the second fan 215 and the pump 311 are connected to the multi-stage power frequency motor, the controller 500 outputs the signals for controlling the rotation speeds through the digital signal output line DO. According to a fault-tolerant operation strategy for the entire system, the host computer 700 issues a fault-tolerant operation instruction of the heat exchange system to the controller 500 through the serial server 600, thereby realizing a fault-tolerant operation mechanism for the first fan 135.

In some embodiments, the controller 500 implements two-way communication through the serial server 600. On the one hand, data can be effectively transmitted to the host computer 700, and monitoring of various parameters of the heat exchange system can be monitored by the host computer 700. Meanwhile, the host computer 700 can issue control instructions to the controller 500 according to priority control levels to realize priority control of the heat exchange system, and when alarm and fault signals occur in the system, the host computer 700 can timely feed back the information to relevant personnel through emails and text messages. On the other hand, the signals collected by the controller 500 can be transmitted to a wireless communication module 800 through the serial server 600, and the wireless communication module 800 timely feeds back key parameters, alarms, faults and other signals to relevant personnel; meanwhile, by terminal developed programs, any set of heat exchange system can be called at any time and corresponding operating status and parameters can be obtained by using mobile devices.

As shown in FIG. 2, in some embodiments, the pipeline assembly 400 includes a first pipeline 410, a second pipeline 420 and a third pipeline 430. The first pipeline 410 connects the pump unit 300 with the supply main pipe 110. The second pipeline 420 connects the return main pipe 120 with the second heat exchange unit 200. The third pipeline 430 connects the second heat exchange unit 200 with the pump unit 300. The first pipeline 410 may be provided with a valve; the second pipeline 420 may be provided with a valve; the third pipeline 430 may be provided with a valve, and the controller 500 may be connected to the respective valves of the first pipeline 410, the second pipeline 420, and the third pipeline 430.

In some embodiments, the first pipeline 410 is provided with a fourth valve 412, and the fourth valve 412 is connected to the controller 500, so that the controller 500 can control the opening, closing and opening degree of the fourth valve 412.

In some embodiments, the second pipeline 420 is provided with a fifth valve 421, and the fifth valve 421 is connected to the controller 500, so that the controller 500 can control the opening, closing and opening degree of the fifth valve 421.

In some embodiments, the third pipeline 430 is provided with a sixth valve 431, and the sixth valve 431 is connected to the controller 500, so that the controller 500 can control the opening, closing and opening degree of the sixth valve 431.

The controller 500 can comprehensively control the opening and closing of the fourth valve 412, the fifth valve 421, and the sixth valve 431, thereby switching the first heat exchange unit 100, the second heat exchange unit 200, and the pump unit 300 out of or into the system. For example, when the controller 500 controls the fourth valve 412 and the fifth valve 421 to be closed at the same time, the first heat exchange unit 100 is switched out of the system, to facilitate the maintenance of the first heat exchange unit 100. By closing any two of the fourth valve 412, the fifth valve 421, and the sixth valve 431, the units between the two closed valves of the system can be effectively isolated, ensuring that the second medium is discharged or injected as little as possible during the maintenance process, thereby reducing the maintenance workload and the waste of the second medium.

The controller 500 can comprehensively control the opening degrees of the fourth valve 412, the fifth valve 421, and the sixth valve 431, thereby controlling the flow of the second medium circulating in the heat exchange system.

In some embodiments, the first pipeline 410 is provided with a safety pressure relief device 411, and the safety pressure relief device 411 is connected to the controller 500, so as to protect the system and prevent the system pressure from being too high.

In some embodiments, the first pipeline 410 is provided with a pressure gauge 413, to facilitate local observation of the system pressure.

In some embodiments, the third pipeline 430 is provided with a quality detection device 432 for detecting the quality of the heat exchange medium in the third pipeline 430, and the quality detection device 432 is connected to the controller 500 and feeds back signals through the analog signal input line AI; the controller 500 determines the quality of the second medium through an upper limit value and a lower limit value of a key index, and sets an alarm value when the key index for the quality of the second medium is close to the limit value. The controller 500 can feed back signals to the host computer 700 and the wireless communication module 800 through the serial server 600, and can display values of the key index in real time. In the above embodiments, the quality detection device 432 can effectively monitor the quality change of the second medium in the heat exchange system during circulation, and effectively determine whether the second medium becomes invalid. When the second medium becomes invalid, warning and replacement signals can be fed back, thereby reducing corrosion and damage to the parts of the heat exchange system and improving the service lives of the various parts of the heat exchange system.

In some embodiments, the third pipeline 430 is provided with an injection-discharge-filtration device 433 and a second differential pressure transmitter 434. The injection-discharge-filtration device 433 is adapted to inject, discharge and filter the heat exchange medium in the third pipeline 430, to ensure the cleanliness of the second medium entering the pump unit 300 and the overall cleanliness thereof in the heat exchange system, thereby protecting the pump 311 and preventing the first heat exchanger 131 and the second heat exchanger 211 from being blocked. The second differential pressure transmitter 434 is connected to an inlet end and an outlet end of the injection-discharge-filtration device 433, the second differential pressure transmitter 434 is connected to the controller 500, and the second differential pressure transmitter 434 is adapted to determine whether the injection-discharge-filtration device 433 becomes invalid and whether it needs to be replaced.

As shown in FIG. 2 and FIG. 4, in some embodiments, each pump branch 310 is provided with a check valve 314, the check valve 314 is located downstream of the pump 311, and the check valve 314 can prevent the second medium from flowing back and thus damaging the pump 311.

In some embodiments, each pump branch 310 is provided with a pressure stabilizing device 315, and the pressure stabilizing device 315 is located upstream of the pump 311, to reduce pressure fluctuations of the heat exchange system.

In some embodiments, each pump branch 310 is provided with a first gas exhaust device 316, to facilitate the effective exhaust of gas during the operation of the heat exchange system and reduce the failure rate of the pump 311.

In some embodiments, each pump branch 310 is provided with a first leakage detection device 317, and the first leakage detection device 317 may be connected to the controller 500, to facilitate the determination of whether the corresponding pump 311 has liquid leakage, and in some embodiments, a prompt message may be issued when the liquid leakage occurs.

In some embodiments, the heat exchange system includes a third pressure information component, the third pressure information component is connected to the inlet and outlet ends of the pump unit 300, and the third pressure information component can be connected to the controller 500 and output third pressure information to the controller 500. In some embodiments, the third pressure information component includes at least two third pressure transmitters 402, and the inlet end and the outlet end of the pump unit 300 are respectively provided with the third pressure transmitters 402. The at least two third pressure transmitters 402 may be connected to the controller 500 and output the third pressure information. By providing the third pressure information component at the inlet and outlet ends of the pump unit 300, the overall resistance change of the system and the safety of the system operation can be determined.

As shown in FIG. 2 and FIG. 3, in some embodiments, each first heat exchange branch 130 is provided with a second liquid leakage detection device 136, and the second liquid leakage detection device 136 is connected to the controller 500, to locate and determine the leakage condition of the corresponding first heat exchanger 131.

In some embodiments, third gas exhaust devices 101 are provided at the top of the supply main pipe 110 and the return main pipe 120. The third gas exhaust devices 101 may be automatic gas exhaust devices to facilitate local gas exhaust of the system. The supply main pipe 110 and the return main pipe 120 may be respectively provided with seventh valves 102, and the third gas exhaust devices 101 are respectively communicated with the corresponding seventh valves 102 and the supply main pipe 110 or the return main pipe 120 to facilitate the replacement and maintenance of the third gas exhaust devices 101.

In some embodiments, an eighth valves 103 are provided at the bottom of the supply main pipe 110 and the return main pipe 120, to facilitate the discharge of the liquid at the local lowest point of the system.

As shown in FIG. 2 and FIG. 5, in some embodiments, each second heat exchange branch 210 is provided with a second gas exhaust device 216, and the second gas exhaust device 216 may be connected to the second heat exchanger 211, for effective gas exhaust of the system.

In some embodiments, each second heat exchanger 211 is connected with a third leakage detection device 217, and the third leakage detection device 217 is connected with the controller 500, to locate and determine the leakage condition of the second heat exchanger 211.

The above-mentioned first leakage detection device 317, the second leakage detection device 136, and the third leakage detection device 217 may all be connected to the controller 500. In some other embodiments, further leakage detection devices may be provided in other key components and high-risk position and connected to the controller 500; these leakage detection devices feed back signals to the controller 500 through the digital signal input line; the controller 500 intelligently locates the faulty components and risk positions by receiving the signals, and feeds back the signals to the host computer 700 and the wireless communication module 800 through the serial service 600.

The embodiments of the present application also provide a motor, and the motor, for example, includes the heat exchange system according to any of the above embodiments, wherein the first heat exchange unit 100 of the heat exchange system is integrated in the area to-be-cooled of the motor.

In the motor according to the embodiments of the present application, the first pressure information component on each first heat exchange branch 130 can obtain the pressure change information and pressure resistance change information between the inlet and outlet ends of the first heat exchanger 131 on the corresponding first heat exchange branch 130, and by pressure calculation, the blocking condition of the first heat exchanger 131 on the corresponding first heat exchange branch 130 can be determined. The first valve group on each first heat exchange branch 130 can quickly switch the corresponding first heat exchange branch 130 into or out of the heat exchange system by opening and closing actions. The opening and closing of the first valve group in each first heat exchange branch 130 is controlled according to the first pressure information of the first pressure information component. For example, when it is obtained that the corresponding first heat exchanger 131 is blocked according to the first pressure information, the first valve group is controlled to switch the first heat exchange branch 130 out of the system. Since the first heat exchange unit 100 includes a plurality of first heat exchange branches 130 connected in parallel with each other, and the remaining normal working first heat exchange branches 130 can continue to complete the work of cooling the heat-generating components of the motor 900, the fault tolerance capacity and reliability of the heat exchange system is improved.

In some embodiments, the motor may be a motor in a wind power generator. In the motor according to the embodiments of the present application, the controller 500 is connected to various components in the heat exchange system, and can intelligently locate the components when the components fail and determine the required spare pieces and spare parts before maintenance. In the case that the wind power generator is an offshore wind power generator, this can avoid a second trip to sea caused by insufficient maintenance spare pieces and spare parts.

The motor and the heat exchange system included by the motor according to the embodiments of the present application, can improve the fault-tolerant operation performance of the heat exchange system, thereby being conducive to improving the reliability of the heat exchange system, and in the event of a local key component failure, the motor and the heat exchange system can continue to operate without halt.

According to the above-mentioned embodiments of the present application, these embodiments do not describe all the details in detail, nor do they limit the application to only the specific embodiments described. Obviously, according to the above description, many modifications and changes can be made. This specification selects and specifically describes these embodiments for better explaining the principles and practical applications of the present application, so that the person skilled in the art can make good use of the present application and make modifications on the basis of the present application. The present application is limited merely by the claims and their full scope and equivalents.

What is claimed is:

1. A heat exchange system for cooling heat-generating components of a motor, wherein the heat exchange system comprising:
   a first heat exchange unit, placed in an area to be cooled of the motor to exchange heat and comprising a plurality of first heat exchange branches connected in parallel with each other;
   a second heat exchange unit, arranged outside the motor and being communicated with the first heat exchange unit through a pipeline assembly to form a closed-loop heat exchange circuit,
   wherein each of the first heat exchange branches is provided with a first heat exchanger, a first valve group and a first pressure information component, and opening and closing of the first valve group is controlled according to first pressure information from the first pressure information component.

2. The heat exchange system according to claim 1, wherein the first heat exchanger is arranged in the area to be cooled; the first valve group comprises at least two first valves, an inlet end and an outlet end of the first heat exchange branch are respectively provided with the first valves; the first pressure information component comprises at least two first pressure transmitters, an inlet end and an outlet end of the first heat exchanger are respectively provided with the first pressure transmitters, and the at least two first pressure transmitters output the first pressure information.

3. The heat exchange system according to claim 1, wherein the first heat exchange unit further comprises a supply main pipe and a return main pipe, and the plurality of the first heat exchange branches is communicated with the supply main pipe and the return main pipe respectively,
   wherein the supply main pipe and the return main pipe are both tubes in form of rings, and the plurality of first heat exchange branches are evenly distributed on outer peripheries of the supply main pipe and the return main pipe; and the plurality of the first heat exchange branches are arranged with the same path.

4. The heat exchange system according to claim 3, wherein the second heat exchange unit comprises two or more second heat exchange branches arranged in parallel, and each of the second heat exchange branches is provided with a second heat exchanger, a third valve group, and a second pressure information component, and opening and closing of the third valve group is controlled according to second pressure information from the second pressure information component.

5. The heat exchange system according to claim 4, wherein the second heat exchanger is arranged outside the motor; the third valve group comprises at least two third valves, an inlet end and an outlet end of the second heat exchange branch are respectively provided with the third valves; the second pressure information component comprises at least two second pressure transmitters, an inlet end and an outlet end of the second heat exchanger are respectively provided with the second pressure transmitters, and the at least two second pressure transmitters output the second pressure information.

6. The heat exchange system according to claim 4, further comprising a controller,
   each of the first heat exchange branches is provided with a first flow transmitter, the first flow transmitter is connected to the controller, and the controller controls an opening degree of the first valve group according to first flow information from the first flow transmitter; and
   each of the second heat exchange branches is provided with a second flow transmitter, the second flow transmitter is connected to the controller, and the controller controls an opening degree of the second valve group according to second flow information from the second flow transmitter.

7. The heat exchange system according to claim 6, wherein at least one of the pipeline assembly, the supply main pipe, and the return main pipe is connected with a third temperature transmitter, the supply main pipe is provided with a first temperature transmitter, and the return main pipe is provided with a second temperature transmitter,
   the third flow transmitter, the first temperature transmitter, and the second temperature transmitter are connected to the controller, and the controller obtains a total heat dissipation amount of the heat exchange system according to the first flow information from the first flow transmitter, the second flow information from the second flow transmitter, third flow information from the third flow transmitter, first temperature information from the first temperature transmitter, and second temperature information from the second temperature transmitter.

8. The heat exchange system according to claim 7, wherein each of the first heat exchange branches is provided with a first fan in air communication with the first heat exchanger, each of the second heat exchange branches is provided with a second fan in air communication with the second heat exchanger, and the first fan and the second fan are connected to the controller;
   the heat exchange system further comprises a stator temperature transmitter connected to a stator of the motor, a rotor temperature transmitter connected to a rotor of the motor, and an environmental temperature transmitter and a wind speed sensor arranged outside of the motor, the stator temperature transmitter the rotor temperature transmitter, the environmental temperature transmitter and the wind speed sensor are connected to the controller, and the controller controls rotation speeds of the first fan, the second fan and the pump according to stator temperature information from the stator temperature transmitter, rotor temperature information from the rotor temperature transmitter, environmental temperature information from the environmental temperature transmitter, and wind speed information from the wind speed sensor.

9. The heat exchange system according to claim 8, wherein the controller comprises an accumulated data processing module, and the accumulated data processing module continuously collects rotation speed combination information and the corresponding power consumption information formed by the first fan, the second fan and the pump under different rotation speed combinations, and establishes a mapping model to different total heat dissipation amounts, and according to each of the total heat dissipation amounts in the mapping model in real time, the cumulative data processing module controls the rotational speeds of the first fan, the second fan, and the pump with the rotational speed combination information corresponding to the power consumption information of lowest power consumption.

10. The heat exchange system according to claim 4, further comprising a controller, each of the first heat exchange branches is provided with a second liquid leakage detection device, and the second liquid leakage detection device is connected to the controller;

each of the second heat exchange branches is provided with a second gas exhaust device;

each of the second heat exchangers is connected with a third liquid leakage detection, and the third liquid leakage detection device is connected to the controller.

11. The heat exchange system according to claim 1, further comprising:

a pump unit, communicated into the closed-loop heat exchange circuit through the pipeline assembly, and comprising two or more pump branches arranged in parallel, each of the pump branches being provided with a pump, a second valve group and a first differential pressure transmitter, and opening and closing of the second valve group being controlled according to first differential pressure information from the first differential pressure transmitter.

12. The heat exchange system according to claim 11, wherein the second valve group comprises at least two second valves, and an inlet end and an outlet end of the pump branch are respectively provided with the second valves; the first differential pressure transmitter is connected to an inlet end and an outlet end of the pump.

13. The heat exchange system according to claim 11, wherein the pipeline assembly comprises a first pipeline, a second pipeline and a third pipeline, the first pipeline connects the pump unit with the supply main pipe, and the second pipeline connects the return main pipe with the second heat exchange unit, and the third pipeline connects the second heat exchange unit with the pump unit.

14. The heat exchange system according to claim 13, the heat exchange system further comprises a controller, the controller is connected with the respective valves on the first pipeline, the second pipeline and the third pipeline, the first pipeline is provided with a safety relief device, and the safety relief device is connected to controller;

the third pipeline is provided with a quality detection device, and the quality detection device is connected to the controller;

the third pipeline is provided with an injection-discharge-filtration device and a second differential pressure transmitter, the injection-discharge-filtration device is adapted for injection, discharge and filtration of medium in the third pipeline, the second differential pressure transmitter is connected to an inlet end and an outlet end of the injection-discharge-filtration device, and the second differential pressure transmitter is connected to the controller.

15. The heat exchange system according to claim 11, wherein each of the pump branches is provided with a check valve, and the check valve is located downstream of the pump;

each of the pump branches is provided with a pressure stabilizing device, and the pressure stabilizing device is located upstream of the pump;

each of the pump branches is provided with a first gas exhaust device;

each of the pump branches is provided with a first leakage detection device, the heat exchange system further comprises a controller, and the first leakage detection device is connected to the controller.

16. A motor comprising the heat exchange system according to claim 1, wherein the first heat exchange unit of the heat exchange system is integrated in the area to be cooled of the motor.

17. The motor according to claim 16, wherein the first heat exchanger is arranged in the area to be cooled; the first valve group comprises at least two first valves, an inlet end and an outlet end of the first heat exchange branch are respectively provided with the first valves; the first pressure information component comprises at least two first pressure transmitters, an inlet end and an outlet end of the first heat exchanger are respectively provided with the first pressure transmitters, and the at least two first pressure transmitters output the first pressure information.

18. The motor according to claim 16, wherein the first heat exchange unit further comprises a supply main pipe and a return main pipe, and the plurality of the first heat exchange branches is communicated with the supply main pipe and the return main pipe respectively, wherein the supply main pipe and the return main pipe are both tubes in form of rings, and the plurality of first heat exchange branches are evenly distributed on outer peripheries of the supply main pipe and the return main pipe; and the plurality of the first heat exchange branches are arranged with the same path.

19. The motor according to claim 16, the heat exchange system further comprises:

a pump unit, communicated into the closed-loop heat exchange circuit through the pipeline assembly, and comprising two or more pump branches arranged in parallel, each of the pump branches being provided with a pump, a second valve group and a first differential pressure transmitter, and opening and closing of the second valve group being controlled according to first differential pressure information from the first differential pressure transmitter.

20. The motor according to claim 19, wherein the second valve group comprises at least two second valves, and an inlet end and an outlet end of the pump branch are respectively provided with the second valves; the first differential pressure transmitter is connected to an inlet end and an outlet end of the pump.

* * * * *